United States Patent [19]

Kobayashi

[11] 4,026,168

[45] May 31, 1977

[54] EXHAUST GAS PURIFICATION SYSTEM

[75] Inventor: Nobuyuki Kobayashi, Toyota, Japan

[73] Assignee: Toyota Jidosha Kogyo Kabushiki Kaisha, Toyota, Japan

[22] Filed: Apr. 9, 1976

[21] Appl. No.: 675,272

Related U.S. Application Data

[63] Continuation of Ser. No. 489,542, July 18, 1974, abandoned.

[30] Foreign Application Priority Data

Jan. 28, 1974   Japan .................... 49-11163[U]

[52] U.S. Cl. .................. 74/860; 74/857; 123/97 B; 123/102
[51] Int. Cl.² ............... B60K 41/18; F02D 31/00
[58] Field of Search ......... 123/97 B, 102, 103 R, 123/103 E; 74/872, 873, 874, 857, 858, 860

[56] References Cited

UNITED STATES PATENTS

| | | | |
|---|---|---|---|
| 2,940,331 | 6/1960 | Leary | 74/857 |
| 3,603,297 | 9/1971 | Sherwin et al. | 123/97 B |
| 3,643,526 | 2/1972 | Thornburgh | 74/860 |
| 3,691,873 | 9/1972 | Lombard et al. | 74/860 X |
| 3,707,892 | 1/1973 | Kuroda et al. | 74/860 X |
| 3,757,611 | 9/1973 | Buck | 74/860 |
| 3,805,642 | 4/1974 | Danek et al. | 74/860 |
| 3,821,943 | 7/1974 | Toda et al. | 123/97 B |

*Primary Examiner*—Samuel Scott
*Assistant Examiner*—Lance W. Chandler
*Attorney, Agent, or Firm*—Stevens, Davis, Miller & Mosher

[57] ABSTRACT

There is disclosed an exhaust gas purifying system adapted for use with an automotive vehicle having an automatic transmission. The system includes a device for preventing the return of a throttle valve to the idling position. A switch is closed when a shift lever is in a predetermined range so that the position control device may be actuated to prevent the throttle valve from being returned to the idling position when the speed of the vehicle or the negative pressure in the intake manifold is in excess of a predetermined magnitude. Emission of pollutants may be decreased, and safe driving is insured.

3 Claims, 2 Drawing Figures

EXHAUST GAS PURIFICATION SYSTEM

This is a continuation of application Ser. No. 489,542 filed July 18, 1974 now abandoned.

BACKGROUND OF THE INVENTION

The present invention relates to an exhaust gas purifying system for an automotive vehicle having an automatic transmission. Under predetermined conditions the return of the throttle valve of the carburetor to the idling position when the vehicle is decelerated is prevented thereby decreasing the unburned compounds in the exhaust gases. Under other predetermined conditions an effective engine brake is fully maintained.

In general, when automotive vehilces are decelerated, the volumetric efficiency of an internal combustion engine is increased so as to decrease the unburned compounds in the exhaust gases. For this purpose, there have been devised and demonstrated various methods. In one method, a throttle valve in a carburetor is opened to some extent in response to the rise of negative pressure in the intake manifold in excess of a predetermined magnitude or the fuel-air mixture is injected downstream of the throttle valve. In another method, stop means is provided to return the throttle valve to the idling position. However, the device for increasing the volumetric efficiency when the vehicle is decelerated, thereby decreasing the unburned compounds in the exhaust gases has a distinct defect in that the efficiency of the engine braking is not satisfactory when the vehicle is decelerated. In an automotive vehicle with an automatic transmission, the shift lever is shifted to the low or second range in order to produce the engine brake because when the shift lever is in the drive range or automatic shift range, the automatic transmission is automatically shifted up from the second range into the third range as the speed of the vehicle is increased. In an automotive vehicle, that is an automative vehicle with an automatic transmission incorporating the exhaust gas purifying system of the type described, the volumetric efficiency is also increased in the low or second range so that the efficiency of the engine braking is considerably reduced. That is, shifting down into the low or second range does fail to produce efficient engine braking. As a result, even when accelerator pedal is released, engine braking is not produced as expected so that the foot brake must be frequently applied when the vehicle is going down a long downhill. Therefore, there arises the problem of the overheat of the brake, a safety hazard.

SUMMARY OF THE INVENTION

One of the objects of the present invention is therefore to provide an exhaust gas purifying system adapted to interrupt its function when the engine brake is required.

Briefly stated, according to the present invention, when a shift lever is shifted into the drive range the return of the throttle valve to the idling position is prevented while when the shift lever is in a position other than drive, a valve incorporated in the exhaust gas purifying system is energized to prevent increases in the volumetric efficiency of the engine when the vehicle is decelerated.

DESCRIPTION OF THE PREFERRED EMBODIMENTS

Figure 1:
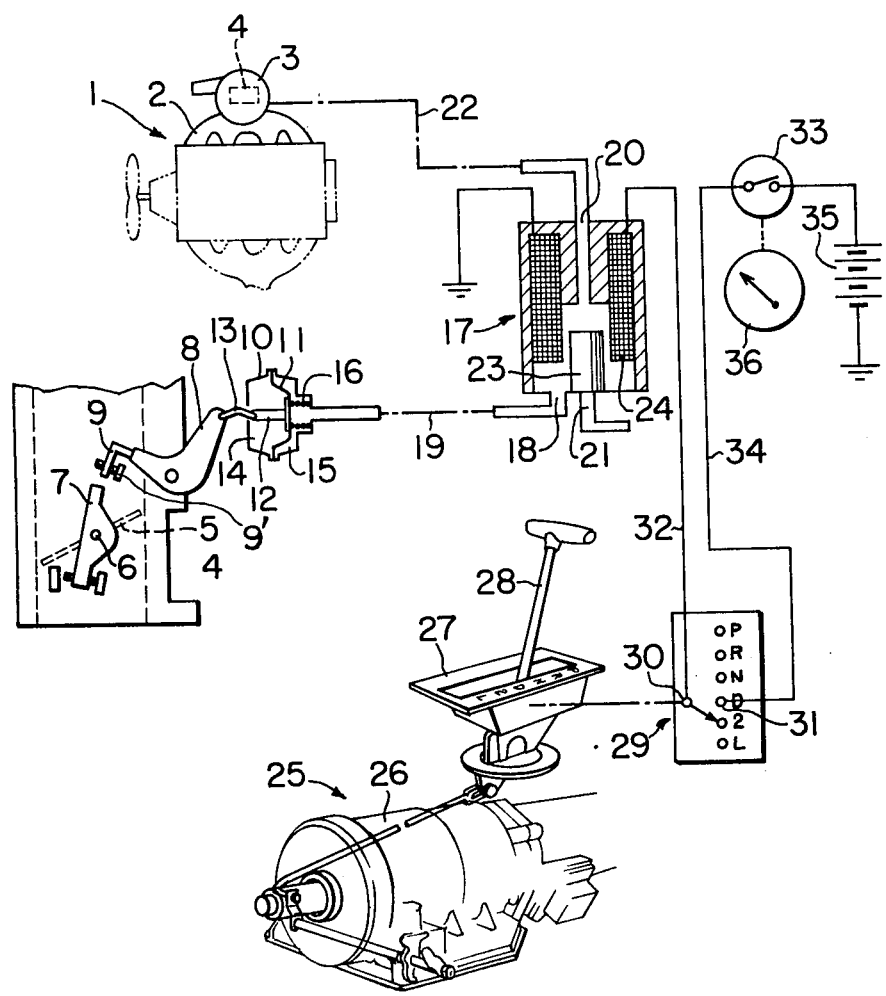
FIGS. 1 and 2 are schematic diagrams of first and second embodiments of exhaust gas purifying systems according to the present invention.

First Embodiment, FIG. 1

Referring to FIG. 1, an intake manifold 2 bolted to an engine body 1 is supplied with the fuel-air mixture through an air cleaner 3 and a carburetor 4. A rotary shaft 6 of a throttle valve 5 is rotatably supported by the barrel of the carburetor 4. Shaft 6 is extended through the barrel and fixed to a lever 7.

The throttle valve 5 is operatively coupled to an accelerator pedal (not shown). A stop 9 which is adapted to engage with one end of the lever 7 is fixed to one end of a rocker or bell crank 8 pivoted to the carburetor 4. Therefore, when the stop 9 engages with the lever 7, the opened throttle valve 5 is prevented from being returned to the idling position.

When the engine is decelerated, the intake air is decreased in quantity so that the volumetric efficiency may be prevented from being excessively reduced and increases in unburned components in the exhaust gases may be also prevented. The stop 9 has an adjusting screw 9' thereon so that the engagement with the lever 7 may be suitably adjusted. The other end of the rocker 8 is connected through a link 13 to a shaft 12 which in turn is connected to a diaphragm 11 in a diaphragm case or box 10. The diaphragm case or box 10 is divided into two chambers 14 and 15. The chamber 14, through which the shaft 12 extends, is in communication with the surrounding atmosphere while in the right diaphragm chamber 15, as seen in FIG. 1, there is disposed a spring 16 biasing the diaphragm 11 to the left as seen in FIG. 1. Chamber 15 communicates through a pipe line 19 with a discharge port 18 of a solenoid controlled valve 17.

The solenoid controlled valve 17 is provided with a negative pressure admission port 20 and a port 21 in communication with the surrounding atmosphere either of which may be selectively connected to the discharge port 18. The negative pressure admission port 20 is in communication with intake manifold 2 through a pipe line 22. In the instant embodiment, the negative pressure in the intake manifold 2 is exerted on the diaphragm 11, but it is to be understood that the negative pressure in the carburetor 4 may be used to actuate the diaphragm 11. The solenoid controlled valve 17 has a valve body 23 which is adapted to selectively close either the negative pressure admission port 20 or the air admission port 21. The valve body 23 is shifted in response to the energization or de-energization of a solenoid 24.

An automatic transmission system generally indicated by 25 comprises a main body 26 and an operating or control unit 27 which is shifted by a shift lever 28 into the parking range, the reverse range, the neutral range, the drive range, the second range or the low or first range. A contact 30 of an electric switch 29 attached to the shift lever 28 is adapted to make into contact with a contact 31 in the operating or control unit 27 when the shift lever 28 is shifted into the drive range D. The contact 30 on the shift lever 28 is electrically connected through a lead wire 32 to the solenoid 24 of the solenoid controlled valve 17. The other contact 31 is electrically connected to a battery 35 through a lead wire 34 and a switch 33 which is adpated to be closed in response to the signal from a vehicle speed sensor or detector 36 when the speed is in excess of a predetermined speed. The speed sensor 36 is of the conventional type capable of closing the switch 33 by electrically detecting the vehicle speed.

Next the mode of operation of the exhaust gas purifying system with the above construction will be described hereinafter. It is assumed that the shift lever 28 is shifted into the D range so that the switch 29 is closed. Then, the current flows from the battery 35 through the lead wire 34, the switches 33 and 29 and the lead wire 32 into the solenoid 24 so that the latter is energized to cause the valve 23 to close the negative pressure admission port 20. As a result, the discharge port 18 of the solenoid controlled valve 17 is in communication with the air admission port 21 so that the atmospheric pressure is transmitted into the right diaphragm chamber 15 through the pipe 19. The diaphragm 11 is caused to be moved under the force of the spring 16 so that the rocker 8, which is coupled to the diaphragm 11 through the link 13 and the shaft 12, is caused to be rotated in the counterclockwise direction. As a result, the stopper 9 at one end of the rocker 8 is made to come into engagement with the one end of the lever 7. Thus, when the vehicle is decelerated from a predetermined speed, the throttle valve 5 is to be brought into the idling position, but the return of the throttle valve 5 is prevented by the engagement of the lever 7 with the stopper 9 so that it is stopped immediately before the idling position. Therefore, the excessive decrease in volumetric efficiency of the engine may be prevented so that the unburned components in the exhaust gases may be decreased.

When the vehicle speed is less than a predetermined speed and the switch 33 is opened, no current flows into the solenoid 24 so that the return of the throttle valve 5 may be prevented by the stopper 9.

Next the mode of operation will be described when the shift lever 28 of the automatic transmission 25 is in the second or low range. Under these conditions, the switch 29 in the automatic transmission 25 is opened so that the solenoid 24 in the solenoid controlled valve 17 is de-energized. Therefore, the valve 23 is caused to close the air admission port 21 so that the discharge port 17 is communicated with the negative pressure admission port 20. As a result, the negative pressure in the intake manifold 2 is admitted into the diaphragm chamber 15 through the pipe 19, the solenoid controlled valve 17 and the pipe 22 so that the diaphragm 11 is caused to be moved to the right against the spring 16. Therefore, the rocker 8 is caused to rotate in the clockwise direction so that the stop 9 is disengaged from the lever 7.

When the shift lever 28 is in the second or low range and the accelerator pedal is released as the vehicle is going down a long hill, the opened throttle valve 5 is returned to the idling position so that engine braking effect is produced. Since the throttle valve is returned to its idling position, the volumetric efficiency of the engine falls too low so that the unburned components in the exhaust gases increase. However, the above conditions are exceptional ones and will not often occur. In other words, the priority should be given to safe driving over the control of the exhaust emission.

Figure 2:
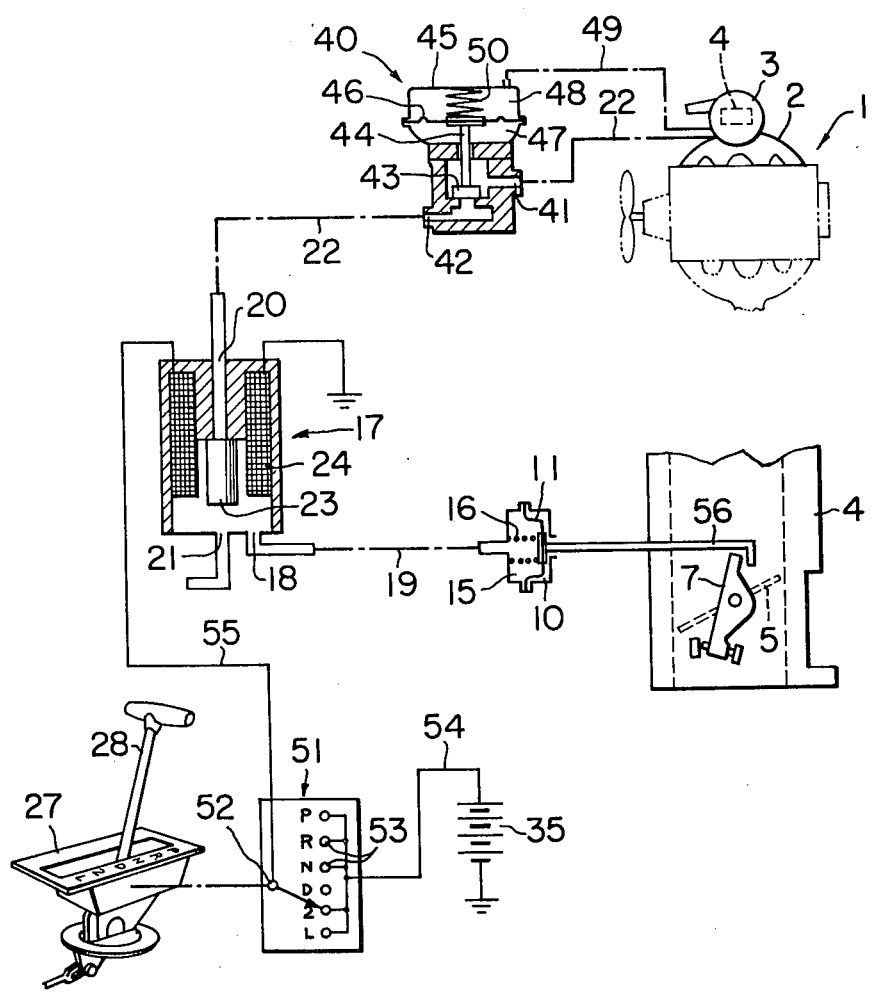

Second Embodiment, FIG. 2

The second embodiment shown diagrammatically in FIG. 2 is substantially similar in construction to the to the first embodiment shown in FIG. 1 except that a negative pressure control valve generally indicated by 40 is used instead of the vehicle sensor in order to prevent the throttle valve 6 from being returned to the idling position when the vehicle or engine is decelerated. The same reference numerals are used to designate similar parts throughout FIGS. 1 and 2.

The negative pressure admission port 20 of the solenoid controlled valve 17 communicates with the intake manifold 2 through the pipe line 22 and an intake port 41 and a discharge port 42 of the negative pressure control valve 40. A valve 43 is disposed between the intake and discharge ports 41 and 42, and is operatively coupled through a shaft 44 to a diaphragm 46 in a diaphragm case or box 45 so that the communication between the intake and discharge ports 41 and 42 may be controlled in response to the movement of the diaphragm 46. The diaphragm chamber 47 is open to the surrounding atmosphere while the chamber 48 is in communication with the intake manifold 2 through a pipe line 49. A spring 50 is disposed in the diaphragm chamber 48 to bias the diaphragm 46 to the valve closing position. Thus, only when the negative intake manifold pressure in excess of a predetermined magnitude is admitted into the chamber 48, is the valve 43 so shifted as to permit the intercommunication between the intake and discharge ports 41 and 42. Therefore, the throttle valve 5 is prevented from being returned to the idling position.

A switch 51 for detecting the position of the shift lever 28 is disposed in the control unit 27 of the automatic transmission 25. A contact 52 is attached to the shift lever 28 and is adapted to make contact with one of the contacts 53 when the shift lever 28 is shifted into the parking range, the reverse range, the neutral range, the second range or the low range. In other words, the contact 52 of the switch 51 makes no contact with a mating contact when the shift lever 28 is in the drive range. The contacts 53 are electrically connected through a lead wire 54 to a battery 35 while the contact 52 is connected through a leadwire 55 to the solenoid 24 of the solenoid controlled valve 17. Therefore, when the shift lever 28 is in any position except the drive range, the switch 51 is closed so that the current flows into the solenoid 24. As a result, the valve 23 closes the negative pressure admission port 20. A rod-shaped stopper 56, which prevents the return of the throttle valve 5, is directly coupled to the diaphragm 11 in the diaphragm box 10. It should be noted that the rocker 8 in the first embodiment is eliminated in the second embodiment, and that when the diaphragm 11 is moved in response to the negative pressure the throttle valve is prevented from being returned to the idling position.

Next the mode of operation will be described when a negative pressure higher than a predetermined magnitude is exerted against the diaphragm 46 in the negative pressure control valve 40 so that the intake and discharge ports 41 and 42 are n the negative pressure control valve 40 so that the intake and discharge ports 41 and 42 are communicated with each other. When the shift lever 28 of the automatic transmission 25 is in the drive range, the switch 51 is opened so that the solenoid 24 of the solenoid controlled valve 17 is not energized, thus causing the valve 23 to close the air admission port 21. As a result, the negative pressure in the intake manifold 2 is admitted into the diaphragm chamber 15 through the pipe line 22, the solenoid controlled valve 17 and the pipe line 19 so that the diaphragm 11 is caused to be moved against the spring 16, causing the stopper 56 to be engaged with the lever 7. Thus, the opened throttle valve 5 is prevented from being returned to the idling position.

Next the mode of operation when the shift lever 28 is in the second or low range will be described. The switch 51 is closed so that the solenoid 24 of the solenoid controlled valve 17 is energized, thereby causing the valve 23 to close the negative pressure admission port 20. Therefore, the atmospheric pressure is admitted into the diaphragm chamber 15 of the diaphragm box 10 through the pipe 19 and the air admission port 21 of the solenoid controlled valve 17. The diaphragm 11 is forced to be displaced under the force of the spring 16 so that the stopper 56 is disengaged from the lever 7. As a result, the throttle valve 5 may be returned to the idling position so that engine braking is produced when the vehicle is going down a long hill. The same is true for the reverse range.

As described above, according to the present invention, when the shift lever of the automatic transmission is in the drive range, the throttle valve is prevented by the stopper from being returned to the idling position. Therefore, a decrease in volumetric efficiency of the engine is prevented when the vehicle is decelerated, and the unburned components in the exhaust gases may be decreased. When the shift lever is in the second or low range, the stopper is so actuated as to permit the return of the throttle valve to the idling position. Therefore, sufficient engine is produced when the vehicle is going down a long hill, whereby safe driving may be ensured.

What is claimed is:

1. In an automobile having an automatic transmission with a selector system having a plurality of positions including a drive position, an intake manifold, a normally closed throttle valve, accelerator means for moving the throttle valve to an open position and a throttle valve stop mechanism, the improvement that comprises means normally biasing said throttle valve stop mechanism to a position permitting the throttle valve to return to the idling position when the selector is in a position other than the drive position and the accelerator means is in repose, said means comprising a vacuum line between said intake manifold and said biasing means, the biasing means being responsive to vacuum in said line to overcome the biasing means and to move said stop mechanism to a position preventing said throttle valve from returning to the idling position when the selector is in the drive position and the accelerator means is in repose and means responsive to the engine vacuum and the position of said selector to block said vacuum line, said blocking means comprising a normally closed solenoid valve, and an electrical circuit to control said solenoid including a switch actuated by the selector system, said circuit being connected so that the solenoid blocks the vacuum line in response to the position of the selector system; a vacuum control valve actuated by the level of engine vacuum and connected between said solenoid valve and the engine intake manifold so that solenoid valve is connected to the manifold only when its vacuum is in excess of a predetermined magnitude.

2. The improvement of claim 1 in which the solenoid valve is responsive to location of the drive selector in positions other than drive.

3. In an automobile having an automatic transmission with a selector system having a plurality of positions including a drive position, an intake manifold, a normally closed throttle valve, accelerator means for moving the throttle valve to an open position and a throttle valve stop mechanism, the improvement that comprises means normally biasing said throttle valve stop mechanism to a position permitting the throttle valve to return to the idling position when the selector is in a position other than the drive position and the accelerator means is in repose, said means comprising a vacuum line between said intake manifold and said biasing means, the biasing means being responsive to vacuum in said line to overcome the biasing means and to move said stop mechanism to a position preventing said throttle valve from returning to the idling position when the selector is in the drive position and the accelerator means is in repose and means responsive to the vehicle speed and the position of said selector to block said vacuum line, said blocking means comprising a normally open solenoid actuated valve, and an electrical circuit to control said solenoid including a vehicle speed detector means connected to open a switch in the circuit when the vehicle speed falls below a predetermined value and a switch actuated by the selector system, said circuit being connected so that the solenoid blocks the vacuum line in response to the vehicle speed and the position of the selector system.

* * * * *